United States Patent Office 2,725,383
Patented Nov. 29, 1955

2,725,383

PROCESS FOR PREPARATION OF 2-AMINOTHIAZOLE

Melvin J. Astle, Shaker Heights, and James B. Pierce, Lyndhurst, Ohio, assignors to Olin Mathieson Chemical Corporation, a corporation of Virginia No Drawing. Application June 2, 1954,
Serial No. 434,056

3 Claims. (Cl. 260—306.8)

Our invention relates to a novel process for the production of the hydrochlorides of 2-aminothiazoles. More particularly, our invention relates to the production of the hydrochlorides of 2-aminothiazoles by the reaction of a chloromethyl-O-heterocyclic compound of the formula:

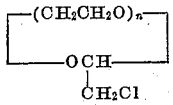

in which $n$ is an integer from 1 to 3 with a substituted or unsubstituted thiourea at an elevated temperature in the presence of an acid catalyst.

Our invention also relates to a novel process for the recovery of 2-aminothiazole hydrochlorides in substantial purity from the glycol containing reaction mixtures produced by the above reaction. Our method of recovery comprises adding to the reaction mixture a substantial amount of a glycol-miscible organic liquid which is non-solvent for 2-aminothiazole hydrochlorides and cooling the mixture to a temperature below about 0° C. This method allows separation of the product from the reaction mixture in substantial purity, thus obviating the usual purification steps.

The products of our new process are well-known compounds, for the most part, which find many uses in the chemical arts. The compound, 2-aminothiazole itself, is particularly useful in the preparation of pharmaceuticals. It is easily converted to sulfathiazole which has been found to be useful in the treatment of pneumonia and certain types of wounds. Recently, 2-aminothiazole has been employed as an intermediate in the production of anti-histaminics, other N-substituted aminothiazoles and various other synthetic products. Many substituted 2-aminothiazoles may be produced by our novel process.

In view of the fact that 2-aminothiazole is frequently used in the preparation of pharmaceuticals, it is important that the compound should be obtained in a substantially pure condition. Previously 2-aminothiazole has been purified by standard methods known to the art which are tedious, wasteful and expensive. Our new process provides for the preparation of the pure hydrochlorides which are easily converted to the pure 2-aminothiazoles as described below.

One of the more satisfactory methods known to the art for preparation of 2-aminothiazole has been by the reaction of alpha-chloroethers or alpha-chlorocarbonyl compounds with thiourea. This method is, however, not without disadvantages. The desired product has been obtained by the reaction of ethyl alpha, beta-dichloroethyl-ether, bis-(alpha,beta-dichloroethyl)ether or alpha, beta, beta'-trichlorodiethylether with thiourea. This type of reaction is exemplified by the following equation:

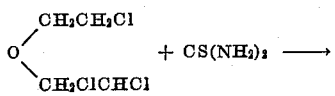

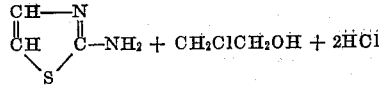

A side reaction occurs in this process between the by-product ethylene chlorohydrin and thiourea, resulting in the formation of hydroxyethylthiourea hydrochloride, according to the following equation:

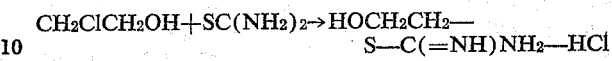

The above reaction consumes approximately one-half of the thiourea charged to the 2-aminothiazole synthesis reaction. This fact makes it necessary to employ a 100% excess of thiourea, which is an economic disadvantage of this method of preparing 2-aminothiazole.

The chief disadvantages of the prior art methods for the preparation of 2-aminothiazole occur in connection with the lengthy and complex purification procedures which are required to recover a product of satisfactory purity from the chemically complex and physically viscous reaction mixtures obtained by the prior art processes. A combination of several purification steps has generally been necessary after first making the reaction mixture alkaline to liberate the base, including distillation crystallization, treatment with activated charcoal, and the like. These procedures necessarily entail loss of valuable product and greatly add to the labor and cost of producing 2-aminothiazole.

Our new process for the preparation of 2-aminothiazole hydrochlorides comprises the reaction of a chloromethyl-O-heterocyclic compound of the formula given above with a thiourea at an elevated temperature in the presence of a catalytic amount of an acid catalyst. The products of the reaction are a 2-aminothiazole hydrochloride and a glycol, the particular glycol formed depending upon the chloromethyl-O-heterocyclic compound employed. For example, when 2-chloromethyl-1,3-dioxolane is employed, the glycol formed is ethylene glycol; when 2-chloromethyl-1,3,6-trioxocane is employed, the glycol formed is diethylene glycol. In the first of these two cases, the reaction is represented by the following equation:

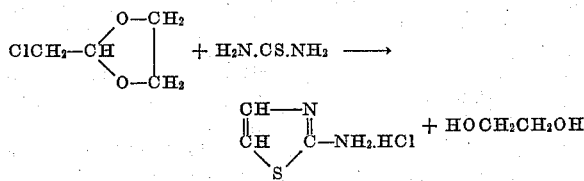

The reaction is carried out at elevated temperatures. The preferred temperature of reaction is the reflux temperature but other temperatures from about 50° C. to the reflux temperature can be used with advantage.

The catalysts employed may be any acid catalyst and is not critical. It is preferred to use strong mineral acids in aqueous solution and in amounts from about 0.1% to 5% based upon the weight of the reactants. Aqueous hydrochloric acid of about 5% to 37% acid strength is particularly suitable when employed in the above amounts. We prefer to use concentrated acid in order to avoid introducing large quantities of water to the reaction mixture.

The reaction is usually carried out with approximately equal molar amounts of the reactants inasmuch as this ratio gives good yields and is most economical. The ratio of the amounts of reactants is not critical however, and may vary widely.

The particular 2-aminothiazole produced by our process depends upon the thiourea employed. Thiourea itself gives rise to 2-aminothiazole. Substituted 2-aminothiazoles may be produced by employing a substituted thiourea. Any N-substituted thiourea having one unsubstituted NH₂ group can be employed, including those substituted with radicals such as alkyl, aryl, cycloalkyl, aralkyl and the like. These radicals may also be substituted by non-reactive substituents. Examples of suitable substituted thioureas include: Methylthiourea, ethylthiourea, unsym-dimethylthiourea, unsym-diethylthiourea, t-butylthiourea, phenylthiourea, p-bromophenylthiourea, unsym-methylphenylthiourea, p-methoxyphenylthiourea, n-butylthiourea, and the like. It has been noted above that our novel reaction always produces a glycol as a by-product. This fact is significant in that the glycol-containing reaction mixture obtained in our process is particularly amenable to our new method of separating the product 2-aminothiazole hydrochlorides directly from the reaction mixture in substantial purity. This separation is accomplished by addition to the reaction mixture of a substantial amount of a glycol-miscible organic liquid which is substantially non-solvent for the 2-aminothiazole hydrochlorides. The diluted reaction mixture is then cooled to a temperature below about 0° C., and the product is separated as a solid in substantial purity.

Suitable glycol-miscible organic liquids include lower ketones such as acetone and methylethylketone and lower alcohols such as methyl, ethyl, propyl, isopropyl alcohol and the like. The amount of the glycol-miscible organic liquid employed is not critical but depends somewhat on the amount of water present in the reaction mixture. For this reason we prefer to keep the amount of water to a minimum in order to avoid the necessity for employing large quantities of precipitant. Water does not appear to have any appreciable effect on the synthesis reaction, either beneficial or detrimental. We have found, with the amounts of water usually present in the reaction mixtures produced by our process, that amounts of organic liquid equal to from about half to twice the volume of the reaction mixture give good separation. When an amount of organic liquid equal to less than half the volume of the reaction mixture is employed, incomplete precipitation or a difficultly filterable product or both is sometimes obtained.

Our preferred method of separation comprises adding acetone to the reaction mixture in an amount equal to from about one-half to twice the volume of the reaction mixture, cooling the mixture to a temperature of from about 0° C. to −50° C. and thus separating the pure product as a solid. This method effects complete precipitation of a readily filterable substantially pure product. The acetone or other glycol-miscible organic liquid used as a precipitant in our process is easily recovered by distillation or other conventional method. The acetone or other precipitating liquid may be added initially to the reaction mixture, but this expedient may result in lowered reflux temperatures and consequent longer reaction times.

Cooling in the separation process can be accomplished externally by any conventional method such as by the use of solid carbon dioxide in conjunction with acetone, chloroform, or other suitable medium.

Our invention has many advantages over the processes of the prior art, especially from an economic point of view. Our reaction produces a glycol as well as the desired product, 2-aminothiazole. The glycol formed is easily recovered and can be converted into a chloromethyl-O-heterocyclic compound, useful as a reactant in our process. Further, each mole of thiourea charged is converted to 2-aminothiazole. It is not necessary to employ a 100% excess of thiourea. Still further, the presence of glycols in the reaction mixture rather than the by-products commonly found in reaction mixtures of the prior art makes our reaction mixture peculiarly adaptable for acetone precipitation.

Our invention also provides a method of utilizing inexpensive, commonly available alpha, beta-chcloroethers in the manufacture of 2-aminothiazole. It is expedient to convert the alpha, beta-chloroethers to the chloromethyl-O-heterocyclics useful in our invention by reaction with a glycol. Ethylene glycol when reacted with these ethers yields chloromethyldioxolane; diethylene glycol yields chloromethyltrioxocane, etc. As has been pointed out above, the glycols necessary for conversion of these ethers to the chloromethyl-O-heterocyclics are produced as by-products in our novel process. This reaction is described in detail in copending application Serial No. 387,798, filed October 2, 1953, of Lafyatis and Zaslowsky. This reaction yields one mole of anhydrous ethylene chlorohydrin per mole of ether charged, an easily separated and valuable by-product.

*Example I*

A mixture of 122 grams (1 mole) of 2-chloromethyl-1,3-dioxolane, 76 grams (1 mole) of thiourea, 100 ml. of water and 35 ml. of 37% aqueous hydrochloric acid was refluxed for about 4 hours. The water was then removed by distillation at reduced pressure. The distillation was discontinued when a vapor temperature of 60° C. at 15 mm. Hg was reached. The mixture was cooled to room temperature prior to adding an equal volume of acetone and further cooling in Dry Ice until precipitation appeared to be complete. The mixture was filtered and the crystals washed with acetone and refiltered. The air-dried crystals represented a conversion of 78%. Further cooling of the filtrate caused the separation of additional crystals bringing the total recovery to 87.2% of 2-aminothiazole hydrochloride. Acetone and ethylene glycol were recovered by distillation of the filtrate.

*Example II*

A mixture of 41.5 grams (0.25 mole) of chloromethyltrioxocane, 19.0 grams (0.25 mole) of thiourea, 25 ml. of water and 9 ml. of a 37% aqueous hydrochloric acid solution was refluxed for about 2 hours. The reaction mixture was distilled until a vapor temperature of 71° C. and a pot temperature of 89° C. at 20 mm. Hg pressure was reached. The residue was mixed with 2 volumes of acetone and chilled in Dry Ice. After precipitation was complete, the solid was filtered, washed with acetone and ether and dried in air. The yield of 27.5 grams represented a conversion of 80.5% to 2-aminothiazole hydrochloride.

Pure 2-aminothiazole melting at 90° C. was prepared from the hydrochloride by dissolving it in water and adding aqueous caustic until precipitation was complete. The crystals were filtered, washed with water and air dried.

*Example III*

A mixture of 41.5 grams (0.25 mole) of chloromethyltrioxocane, 19.0 grams (0.25 mole) of thiourea and 9 ml. of concentrated hydrochloric acid (37%) was refluxed until the liquid temperature rose to 140° C. The mixture was treated with an equal volume of acetone, cooled to Dry Ice temperature and stirred. After precipitation was complete, the 2-aminothiazole hydrochloride was filtered and washed as described in the preceding example. A yield of 27.8 grams, corresponding to 81.2% of theory, was obtained. In the improved procedure of this example the addition of water was omitted except as a part of the concentrated hydrochloric acid and concentration by distillation was avoided.

*Example IV*

A mixture of 41.5 grams (0.25 mole) of chloromethyl trioxocane, 19.0 grams (0.25 mole) of thiourea, 25 ml. of acetone and 9 ml. of concentrated hydrochloric acid (37%) was refluxed for 1 hour. The mixture was cooled in Dry Ice until precipitation appeared to be complete. Filtration and washing of the 2-aminothiazole hydrochloride crystals yielded 26.0 grams representing a conversion of 76%.

Example V

A mixture of 92.8 grams (0.76 mole) of chloromethyl dioxolane, 57.8 grams (0.75 mole) of thiourea and 26.5 ml. of concentrated hydrochloric acid (37%) was warmed to initiate the reaction. After the reaction had subsided, the mixture was refluxed for 1 hour. The resulting mixture was mixed with an equal volume of acetone and cooled in Dry Ice with stirring. When precipitation was complete the reaction mixture was filtered, washed and dried as described in the preceding examples. A total of 84.8 grams of 2-aminothiazole hydrochloride was obtained representing a conversion of 81.2%. Additional product was obtained by concentration of the filtrate, bringing the conversion to 85.1%. Acetone and ethylene glycol were recovered by fractionation of the filtrate under atmospheric and reduced pressure.

It is to be understood that the foregoing examples are for illustration only and are not to be construed as limiting the scope of our invention.

We claim:

1. A process for the production of 2-aminothiazole hydrochloride which comprises reacting a chloromethyl-O-heterocyclic compound of the formula

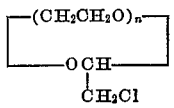

in which $n$ is an integer from 1 to 3 with thiourea at an elevated temperature in the presence of an acid catalyst.

2. A process for the production of 2-aminothiazole hydrochloride which comprises reacting a chloromethyl-O-heterocyclic compound of the formula

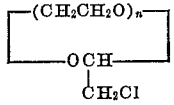

in which $n$ is an integer from 1 to 3 with thiourea at an elevated temperature in the presence of an acid catalyst, adding a glycol-miscible organic liquid substantially non-solvent for said 2-aminothiazole hydrochloride, cooling the reaction mixture to a temperature of about 0° C. to —50° C. and separating solid substantially pure 2-aminothiazole hydrochloride from the mixture.

3. The process of claim 2 in which the glycol-miscible organic liquid is acetone.

References Cited in the file of this patent

UNITED STATES PATENTS

| 2,330,223 | Kyrides | Sept. 28, 1943 |
| 2,600,620 | Crauland | June 17, 1952 |

FOREIGN PATENTS

| 557,145 | Great Britain | Nov. 5, 1943 |
| 667,251 | Great Britain | Nov. 5, 1943 |